(12) United States Patent
Merchant (10) Patent No.: US 7,744,019 B2
(45) Date of Patent: Jun. 29, 2010

(54) SPRAY GUN

(75) Inventor: Matthew Merchant, Vinton, IA (US)

(73) Assignee: Alphagen Materials Technology, Inc., Vinton, IA (US)

( * ) Notice: Subject to any disclaimer, the term of this patent is extended or adjusted under 35 U.S.C. 154(b) by 612 days.

(21) Appl. No.: 11/535,845

(22) Filed: Sep. 27, 2006

(65) Prior Publication Data

US 2009/0008477 A1 Jan. 8, 2009

(51) Int. Cl.
*B05B 7/12* (2006.01)
(52) U.S. Cl. .................. 239/411; 239/427; 239/428; 239/570; 239/419.3; 239/419
(58) Field of Classification Search .............. 239/411, 239/412, 419, 419.3, 427, 428, 570
See application file for complete search history.

(56) References Cited

U.S. PATENT DOCUMENTS

| | | | |
|---|---|---|---|
| 4,262,847 A * | 4/1981 | Stitzer et al. ............. 239/112 |
| 4,824,017 A * | 4/1989 | Mansfield ..................... 239/9 |
| 5,388,763 A | 2/1995 | Moses |
| 5,388,767 A | 2/1995 | Moses |
| 5,388,768 A | 2/1995 | Moses |
| 5,467,899 A * | 11/1995 | Miller ......................... 222/309 |
| 5,529,245 A | 6/1996 | Brown |
| 5,797,546 A | 8/1998 | Reed et al. |
| 6,045,057 A | 4/2000 | Moor et al. |
| 6,090,335 A | 7/2000 | McClure et al. |
| 6,216,752 B1 | 4/2001 | Bailey |
| 6,555,045 B2 | 4/2003 | McClure et al. |
| 6,656,411 B1 | 12/2003 | McClure et al. |
| 6,769,632 B2 * | 8/2004 | Takeuchi ..................... 239/412 |
| 2003/0080211 A1 | 5/2003 | Takeuchi |

* cited by examiner

*Primary Examiner*—Dinh Q Nguyen
(74) *Attorney, Agent, or Firm*—Ryan N. Carter

(57) ABSTRACT

An apparatus for mixing a catalyst with a resin and then spraying the mixture onto a surface. The catalyst is mixed with air before the catalyst/air mixture is introduced to the resin in the mixing tube. The sprayer is provided with a specially designed check valve to prevent resin and catalyst from back flowing into the air/catalyst supply line. The construction of the check valve prevents it from clogging or becoming stuck shut during operation.

4 Claims, 4 Drawing Sheets

SPRAY GUN

BACKGROUND OF THE INVENTION

This invention relates to a method and apparatus for mixing a resin and a catalyst and, more particularly, to an apparatus for efficiently mixing a high viscosity heavily filled resin with a catalyst and pressurized air wherein the catalyst and pressurized air are mixed before introduction to the resin.

Resins have numerous uses including, but not limited to the construction of swimming pools, the exterior coating of buildings, the protective interior coating of tanks, as well as the protective coating of secondary containment walls. A resin such as polyester is typically applied to a surface with a catalyst such as methyl-ethyl-ketone peroxide. Catalysts allow the resin to polymerize and cure. The present state of the art methods of resin application involve the spraying of the resin and methyl-ethyl-ketone peroxide onto a particular surface with a spray gun. A variety of spray guns are known in the art.

An internal mix gun is often used when solvent emissions are a problem, because internal mixing limits the amount of atomized material and catalyst exiting the gun. Internal mix guns generally have three feed lines, a resin line and a catalyst line which feed into a manifold, and an air line. The resin and catalyst are typically mixed in the manifold. After mixing, the resin and catalyst are expelled from the gun in confluence through a nozzle or similar orifice with pressurized air from the air line. The pressurized air supplies sufficient pressure so that the resin and catalyst are sheared and atomized as they are expelled from the gun. A major drawback of this type of gun is that during a spraying operation, catalyzed resin often backs up into and catalyzes within the air supply. Catalyzed resin in the air supply leads to costly and time-consuming down time while the spraying operation is shut down and the air supply is cleared of any obstructions. Standard check valves are rarely effective as they quickly become hardened shut with catalyzed resin or the internal workings of the check valve become frozen with catalyzed resin. Yet another problem with this type of gun is that a portion of the catalyst supply line extends beyond the on/off valve (i.e. between the on/off valve and the manifold) so that when the device is turned off, some catalyst drains from the end of the supply line into the manifold thereby wasting catalyst.

A second type of gun typically used is an external mix gun. In an external mix gun, the resin and catalyst are atomized and expelled separately and directed toward one another. The resin and catalyst combine in the air shortly before contacting the article being treated. A major drawback of the external mix gun is the incomplete mixing of resin and catalyst, which often leads to patches of incompletely catalyzed resin appearing on the finished article. Such portions of uncatalyzed resin can produce points of weakness or blisters on the surface of the finished article.

A more important problem with external mix guns is the exterior atomization of the catalyst. Because of the incomplete mixing of the catalyst with the resin, much of the atomized catalyst disperses into the atmosphere and, more particularly, in the immediate work environment where the application is taking place. Concern over the safety of workers breathing catalyst contaminated air has led to numerous restrictions on the use of external mix guns. Such guns have even been completely banned in at least one state.

Yet another type of gun is disclosed in U.S. Pat. Nos. 5,388,767, 5,388,768, and 5,388,763. In the device disclosed in these patents the resin and catalyst are not mixed in a manifold nor are they mixed after they are expelled. Rather, in these devices, the resin and catalyst are separately introduced into a mixing tube where they mix as they migrate toward the spray tip of the mixing tube. Separately combined with the mixing tube is a pressurized air stream which introduces pressurized air into the mixing tube. The pressurized air aids in mixing the catalyst and resin in the mixing tube and also aids in expelling the catalyst/resin mixture out of the end (spray tip) of the mixing tube. One problem with this design is that in order to prevent the resin from backing up into the catalyst supply line in the event of a clog in the mixing tube, it is necessary to introduce the catalyst into the mixing tube at the same pressure as the resin is introduced, which can approach 3000 pounds per square inch (psi) depending on the viscosity of the resin. It is undesirable to introduce catalyst at such high pressures since catalyst can often be corrosive and dangerous. If a catalyst line ruptured at high pressure, the catalyst could spray violently thereby potentially causing serious damage to life and property. Another problem with the design disclosed in these patents is that it can be difficult for the thick resin to thoroughly mix with the watery catalyst as the catalyst and resin migrate through the mixing tube. In fact, the relatively high viscosity catalyst often creates its own path as it travels through the mixing tube instead of completely mixing with the resin, thereby resulting in incomplete mixing of the resin and catalyst.

The difficulties encountered in the prior art discussed herein above are substantially eliminated by the present invention.

SUMMARY OF THE INVENTION

Accordingly, an object of the present invention is to provide a spray gun wherein the catalyst is introduced and atomized in the air supply line before it is introduced to the resin so that the pressure at which the catalyst is supplied to the system only needs to approximate the pressure at which the air is supplied to the system.

A further object of the present invention is to provide a spray gun wherein the catalyst is introduced and atomized in the air supply line before it is introduced to the resin so that the atomized catalyst thoroughly mixes with the resin in the mixing tube.

Another object of the present invention is to provide a spray gun with a means for supplying an air/catalyst mixture to a resin wherein the resin does not clog the air supply means.

Yet another object of the present invention is to provide a spray gun with means for preventing unmixed catalyst from draining from the end of the supply line when the spray gun is not in use.

These and other objects of the present invention will become apparent upon reference to the following specifications, drawings, and claims.

By the present invention, it is proposed to overcome the difficulties encountered heretofore. To this end, a catalyst and resin sprayer is provided capable of providing a resin in confluence with a catalyst, whereby the catalyst is introduced to and atomized by pressurized air before its introduction with the resin. The sprayer is capable of applying the resin/catalyst mixture to a surface to provide a catalyzed resin coating on the surface. The sprayer has a mixer capable of receiving and mixing the resin and catalyst into a substantially homogeneous mixture. Means operably connected to the mixer for directing the resin and catalyst to the mixer are also provided on the sprayer.

Operably connected to the mixer are means for supplying the pressurized air to the mixer. The catalyst is introduced to and atomized by the pressurized air before it is introduced to the resin in the mixing tube. Upon introduction to the mixing tube, the pressurized air/catalyst serves to mix the catalyst and resin as well as help eject the catalyst and resin mixture from the end of the mixing tube. Means are also provided for spraying the atomized flow of resin and catalyst onto the surface to provide the catalyzed resin coating on the surface. Operably connected to the pressurized air supplying means are means for preventing the resin from entering the pressurized air/catalyst supplying means.

In the one embodiment of the present invention, the means for preventing the resin in the mixer from entering the pressurized air supplying means includes a check valve with a Teflon seat and a stainless steel stopper held in the seat by a spring. The tension on the spring is adjusted so that the stopper moves away from the seat only when the air/catalyst pressure against the seat is greater than the pressure of the resin against the seat.

DETAILED DESCRIPTION OF THE INVENTION

Figure 1:
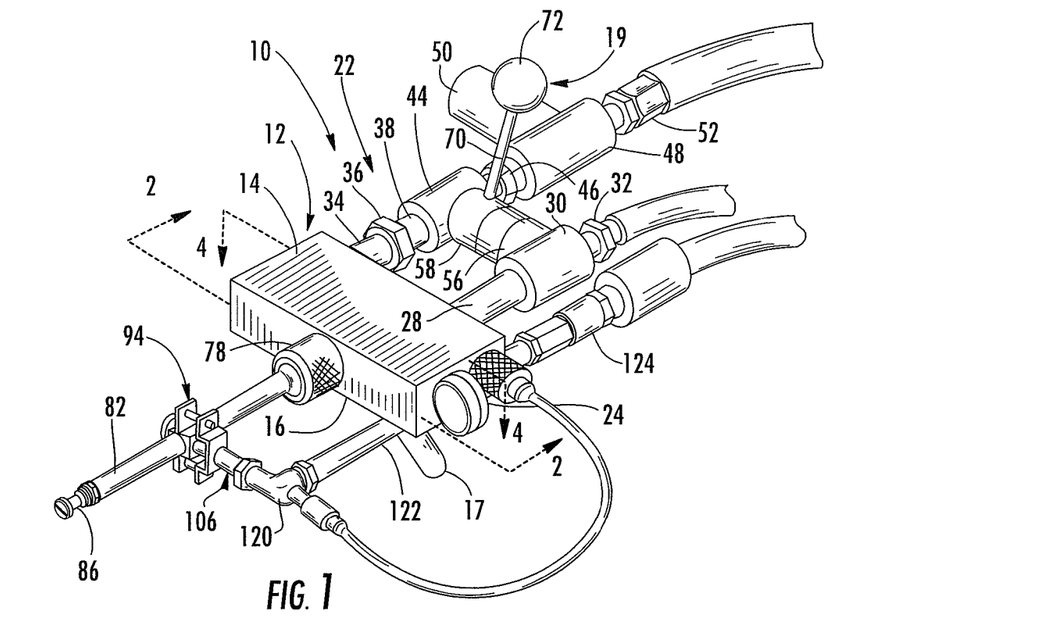
FIG. 1 is a perspective view of the spray gun of the present invention.
Figure 4:
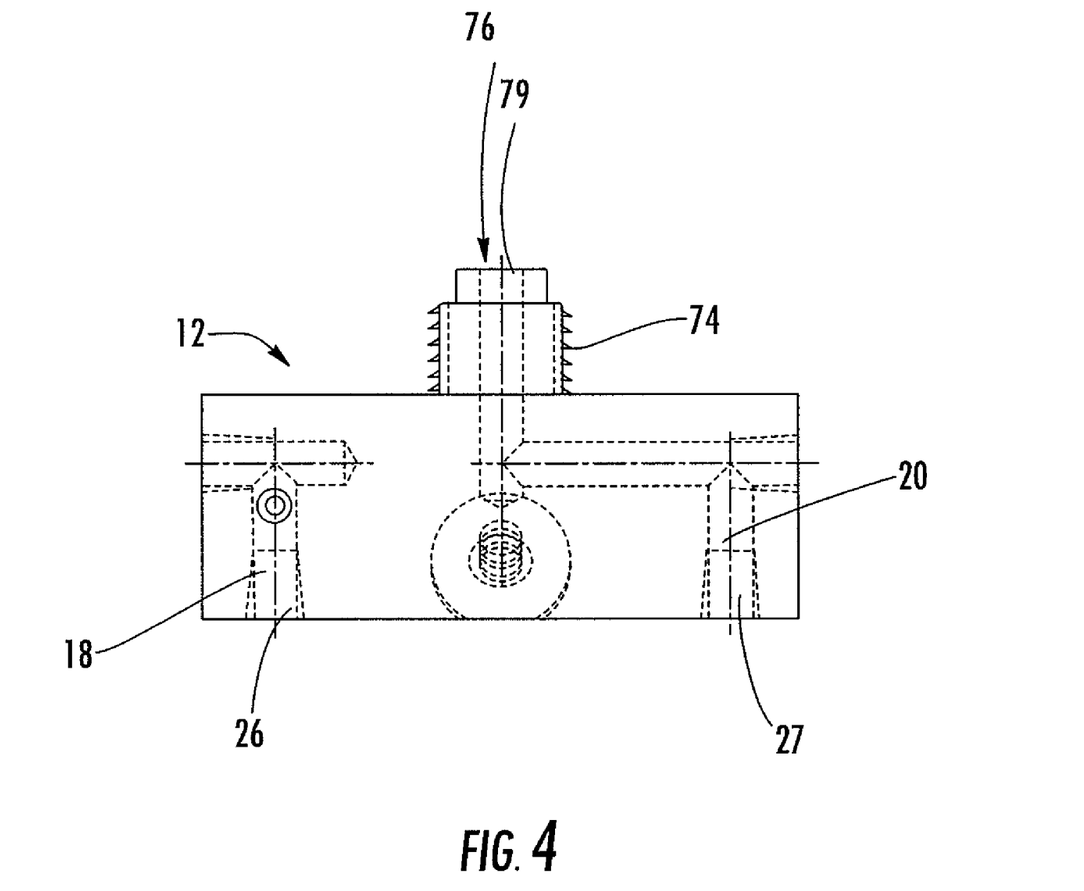
FIG. 4 is a top cross-sectional view of the manifold of the present invention.

In the Figures, a resin application system, specifically, a spray gun 10 is provided with a manifold 12, having a catalyst inlet 26 and a resin inlet 27 (FIGS. 1 and 4). The gun 10 is used to apply heavily-filled systems to a surface. Examples of fillers which may be added to resins to reduce cost or add quality include: silicates, ceramics, gypsum, wood fillers, calcium carbonate, cellulose, glass fibers, and gel coat. These fillers act as extenders or reinforcements of the base resin. It should be noted that although the present invention is described herein primarily for use with a resin/catalyst introduction system, the device and method of the present invention can be used with many other systems for many other purposes including painting.

As seen in FIG. 1, a disposable static mixing tube 82 extends from the manifold 12 and terminates in a spray tip 86. The gun 10 has an air tube 122 which is in fluid communication with the static mixing tube 82 to atomize and spray catalyzed resin from the static mixing tube 82 through the spray tip 86. Catalyst is introduced into the air supply line before the air/catalyst mixture is introduced to the resin in the static mixing tube 82. In one embodiment of the present invention, the manifold 12 is a tooled aluminum block about fifteen centimeters wide, ten centimeters long, and three centimeters deep (FIG. 1). The manifold is a one-piece drilled block having a top 14 and a bottom 16. Secured to the bottom 16 of the manifold 12 is a tapered handle 17, which is preferably angled toward a switch handle 19. The angle of the handle 17 makes the gun 10 easier to hold as it is being operated.

In one embodiment, the manifold 12 is tooled with channels forming two cylindrical passageways, a catalyst passageway 18 and a resin passageway 20 (FIG. 4). The resin passageway 20 begins at one end of the manifold 12 and terminates at another end of the manifold 12 where the resin is directed into the static mixing tube 82. The catalyst passageway 18 begins at one end of the manifold 12 and terminates at another end of the manifold 12 where the catalyst is directed into the pressurized air supply line. In alternate embodiments, the manifold 12 is not needed since the resin can be introduced directly into the static mixing tube 82 and the catalyst can be introduced directly into the air supply line. Preferably, these passageways 18 and 20 are not provided with check valves or O-rings. As resin and catalyst are not mixed within the manifold 12, there is no need to provide check valves to prevent backflow of catalyzed resin into the passageways 18 and 20. O-rings associated with such check valves can also be eliminated. The life of the gun 10 is thereby extended over conventional guns which must be overhauled or discarded when manifold O-rings become coated with hardened resin.

Preferably, connected to the catalyst passageway 18 is a pressure gauge 24 which is mounted to the exterior of the manifold 12, yet operably connected to the passageway 18 to keep the operator informed of the pressure at which the catalyst is moving through the passageway 18 (FIG. 4). The pressure gauge 24 is very effective as an alarm for the present invention, not only warning an operator of a problem, but diagnosing the problem as well.

Preferably, the gauge 24 measures pressures from zero to over one thousand pounds per square inch. During normal operation, the spray gun 10 is operated with a catalyst pressure of between about ninety and one hundred thirty pounds per square inch since the catalyst pressure need only match the air pressure to unseat check valve 107 and allow catalyst to flow through the system, as is further discussed below. If the pressure drops below about ninety pounds per square inch, the pump (not shown) providing catalyst to the gun 10 should be adjusted to increase the flow of catalyst through the gun 10. If the pressure quickly rises to over about one hundred thirty pounds per square inch, the gun 10 is likely blocked with a plug of resin. The gun 10 must then be cleared of any obstruction. If the pressure rises and falls between zero and a normal pressure, the catalyst pump is likely only pumping on one stroke instead of two. The pump must then be repaired to assure accurate application of catalyst and resin. Although a catalyst pressure range of between ninety and one hundred thirty pounds per square inch is given as an example, the pressure may be lower or higher depending on the particular application.

Figures 5, 6:
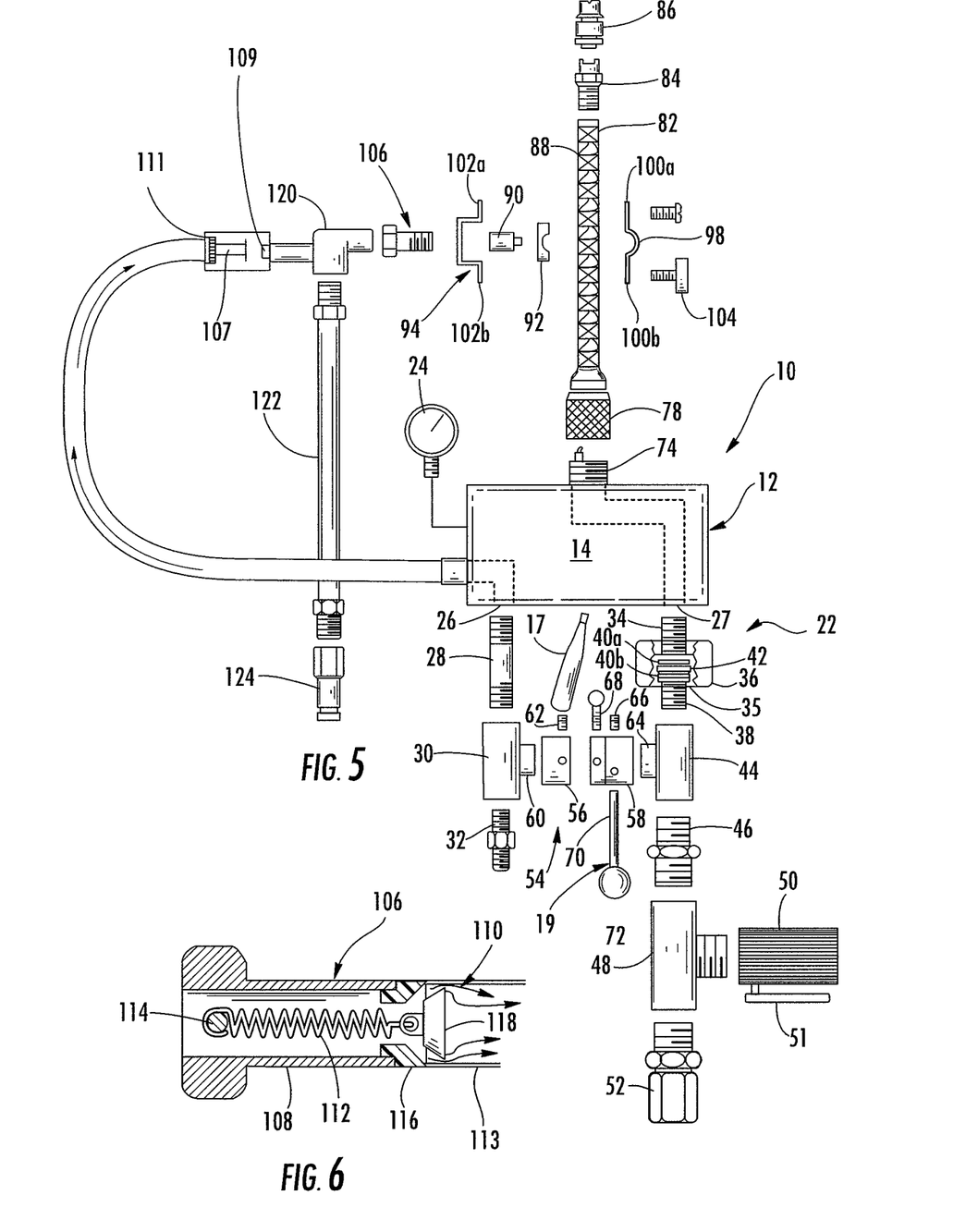
FIG. 5 is an exploded view of the spray gun of the present invention.
FIG. 6 is a side cross-sectional view of the check valve of the present invention.

Preferably, mounted to the catalyst input 26 of the manifold 12 is a stainless steel catalyst pipe nipple 28 (FIG. 5). It is very important to ensure that all parts of the device which come into contact with the catalyst are non-reactive with the catalyst. Contact of methyl-ethyl-ketone peroxide with aluminum or similar reactive material may cause a deadly explosion. The nipple 28 consists of a short section of pipe which connects the manifold 12 to a catalyst ball valve assembly 30. The catalyst ball valve assembly 30 is preferably a one-quarter inch high pressure ball valve, constructed of stainless steel to avoid reaction with the catalyst. The ball valve assembly 30 is connected to a threaded catalyst line connector 32, which allows the spray gun 10 to be connected and disconnected to a catalyst supplying apparatus (not shown). The ball valve assembly 30 thereby acts as a "trigger" or an on/off valve to start and stop the flow of catalyst through the gun 10.

Preferably, connected to the resin input 27 of the manifold 12 is a restricted orifice union 22 (FIG. 5). The restricted orifice union 22 consists of an orifice nipple 34, a coupling nut 36, and a resin connection pipe 38. The coupling nut 36 is in slidable engagement with the resin connection pipe 38 and prevented from coming off of the end of the resin connection pipe 38 by a flange 35 provided on the end of the resin connection pipe 38. Positioned between the orifice nipple 34 and the resin connection pipe 38 are a pair of O-rings 40a-b and an orifice plate 42. The orifice plate 42 is provided with an opening of a smaller diameter than the interior diameter of the orifice nipple 34. The orifice plate 42 is positioned between the orifice nipple 34 and the resin connection pipe 38 and the coupling nut 36 is screwed onto the orifice nipple 34. The coupling nut 36 is tightened until the orifice plate 42 is pressed tightly enough between the O-rings 40a-b to prevent the passage of resin between the O-rings 40a-b and the orifice plate 42.

The diameter of the hole in the orifice plate 42 is somewhat smaller than the interior diameter of the resin connection pipe 38 so that a plug passing through the resin connection pipe 38 is stopped at the orifice plate 42 before entering the manifold 12. When such a clog occurs, the force of spray from the gun 10 will substantially decrease, thereby notifying the operator that the coupling nut 36 must be removed from the orifice nipple 34. After the coupling nut 36 has been removed from the orifice nipple 34, the orifice plate 42 is removed and the resin connection pipe 38 is cleared of any obstruction. The restricted orifice union 22 thereby allows quick, in-the-field removal of plugs. The restricted orifice union 22 is extremely useful as no tools are required to remove plugs from the resin line, even in the field. It is imperative to remove plugs from the line before such plugs reach the resin passageway 20 of the manifold 12, where they would require extensive downtime to be removed (FIGS. 4 and 5).

Connected to the resin connection pipe 38 is a resin ball valve assembly 44 (FIG. 5). The resin ball valve assembly 44 is a one-quarter inch high pressure stainless steel ball valve, preferably capable of withstanding pressures up to two thousand pounds per square inch. A T-valve adapter 46 connects the resin ball valve assembly 44 to a T-valve 48. The right-angle connection of the T-valve 48 is connected to a fluid relief valve 50 which, in the preferred embodiment, is a ⅜ inch standard ball valve. The opposite end connection of the T-valve 48 is connected to a fluid hose T-adapter 52. The fluid hose T-adapter 52 allows the spray gun 10 to be quickly connected and disconnected from a resin hose and supply apparatus. The resin relief valve 50 allows the escape of resin through the valve 50 to prevent extreme pressure from building up and damaging more delicate portions of the gun 10.

The relief valve 50 is provided with a handle 51 which opens and closes the valve 50. The handle 51 may be opened and the valve 50 placed over a reservoir of resin (not shown) to purge the line of air before spraying. The valve 50 may also be used to recycle resin which has been sitting in the line for an extended period of time to prevent settled resin from being applied to a surface.

Operably connected between the catalyst ball valve assembly 30 and the resin ball valve assembly 44 is a ball valve yoke 54, which, when rotated, simultaneously opens both the catalyst ball valve assembly 30 and the resin ball valve assembly 44 (FIG. 5). The ball valve yoke 54 is composed of two pieces, a catalyst connector 56 and a resin and handle connector 58. The catalyst connector 56 is a cylindrical piece of metal which fits over a catalyst ball valve assembly orifice control 60 and is attached thereto by means of a set screw 62.

The resin and handle connector 58 is also a cylindrical piece of steel, but fits over the resin ball valve orifice control 64 (FIG. 5). The resin and handle connector 58 is attached to the resin ball valve orifice control 64 by means of a set screw 66. The internal circumference of the free end of the resin and handle connector 58 is substantially similar to the outer circumference of the catalyst connector 56. The free end of the catalyst connector is inserted into the free end of the resin and handle connector 58 and connected thereto by means of a thumb screw 68.

A switch handle shaft 70 is secured to the resin and handle connector 58. In the preferred embodiment, the switch handle shaft 70 is a steel rod threaded on either end. One end of the shaft 70 is screwed into the resin and handle connector 58, and a handle ball 72 is screwed onto the opposite end of the switch handle shaft 70 to make the shaft 70 easier to grasp and maneuver.

In one embodiment of the present invention, when the shaft is perpendicular to both the catalyst pipe nipple 28 and orifice nipple 34, the ball valves 30 and 44 are closed, thereby preventing the flow of either catalyst or resin into the manifold 12 of the spray gun 10. When the handle ball 72 is pushed toward the manifold 12, the catalyst ball valve assembly 30 and resin ball valve assembly 34 are opened, thereby allowing catalyst and resin to enter the catalyst and resin passageways 18 and 20 of the manifold 12 (FIGS. 4 and 5). It should be noted that other valves known in the art which are able to start and stop the flow of fluids may be used instead of the assembly described above.

Figure 2:
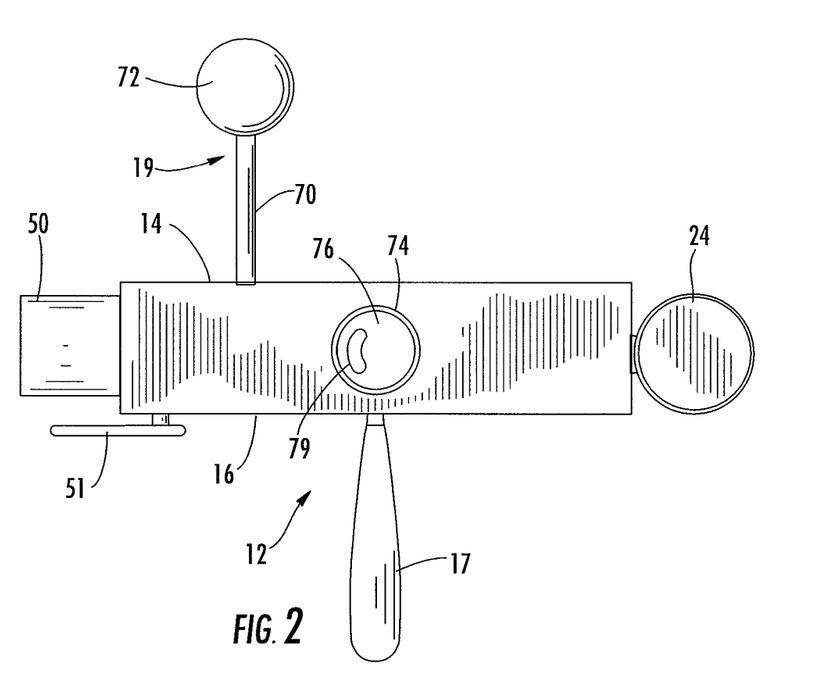
FIG. 2 is a front elevational view of the spray gun of FIG. 1 showing the static mixer removed.

In one embodiment, the resin passageway 20 emerges at the forward end of the manifold 12 at a ferrule mount 74 (FIG. 4). The ferrule mount 74 is a cylindrical protusion extended forwardly from the output end 76 of the manifold 12. The exterior circumference of the ferrule mount 74 is threaded so that a ferrule 78 may be screwed onto and off of the manifold 12. (FIGS. 3-4) The resin passageway 20 exits from a kidney-shaped orifice 79 in the ferrule mount 74 (FIGS. 2 and 4). The resin is then introduced into the static mixing tube 82 as is further described below.

The catalyst passageway 18 emerges from the manifold 12 and is directed into the air supply line (FIG. 5) where the catalyst mixes with and is atomized by pressurized air entering the system through the air tube 122. Preferably, the catalyst passes through a screen filter 111, a first check valve 107, and a proportioning hole 109 before entering the air line (FIG. 5). The screen filter 111 prevents large pieces of catalyst material from entering the system so that large pieces of catalyst material do not clog the proportioning hole 109 and affect the amount of catalyst entering the system. The proportioning hole 109 has a pre determined diameter than helps ensure that the proper amount of catalyst is being introduced into the air line. If more catalyst is desired, a proportioning hole 109 with a larger diameter is used. If less catalyst is desired, a proportioning hole 109 with a smaller diameter is used.

The first check valve 107 may be similar to the check valve shown in FIG. 6. The primary function of this first check valve 107 is to prevent catalyst from draining out of the catalyst supply line when the device is turned off, i.e. when no catalyst is being pumped through the system. As discussed above, prior art devices waste considerable amounts of catalyst and resin because the catalyst in the catalyst line between the on/off valve (ball valve yoke 54) and the end of the catalyst line is allowed to drain out of the catalyst line when the spray gun 10 is turned off. Prior spray guns required running catalyst and resin through them for a few moments before they could be used in order to ensure the catalyst was properly mixing with the resin, thereby wasting both resin and catalyst. The first check valve 107 of the present invention overcomes this problem because it closes when the catalyst supply is turned off thereby not allowing any catalyst to drain out of the end of the catalyst line.

A unique feature of the present invention is that the catalyst pressure need only match the air pressure to unseat check valve 107 and allow catalyst to flow through the system. As discussed above, many prior art devices require the catalyst pressure to match the resin pressure (which can approximate 3000 psi) to ensure resin did not back-up into the catalyst line. The design of the present invention overcomes the need to have the catalyst introduced at such a high pressure because the catalyst is introduced through the air supply line and therefore only needs to match the pressure of the air being introduced, which is typically much lower than the pressure at which the resin is introduced. Typically, in the present invention, air pressure is introduced between about ninety and one hundred thirty psi and flows at about ten cubic feet per min (cfm).

After passing through the first check valve 107 the catalyst is directed into the air supply line, preferably into the ninety-degree adapter 120 of the air line as shown in FIG. 5. However, it should be noted that the catalyst can be introduced into any suitable portion of the air supply line including the air tube 122. The catalyst then passes through a second check valve 106, and eventually into the mixing tube 82 where the atomized catalyst mixes with the resin. The second check valve 106 prevents the flow of resin from backing up into the air/catalyst supply line. The check valve 106 consists of a bolt 108 and a closure mechanism 110 (FIG. 6). The bolt 108 is hollow and is provided with a spring 112 and a spring mount 114 operably connected to both the bolt 108 and the one end of the spring 112. The opposite end of the spring 112 is connected to a frusto-conical stainless steel stopper 118. The spring 112 retains the stopper 118 in a Teflon polytetrafluoroethylene seat 116 which is secured to the circumference of the bolt 108. The Teflon polytetrafluoroethylene seat 116 is designed to engage the surface of the stopper 118 and to prevent material from passing into the bolt 108 from between the seat 116 and the stopper 118. The stopper 118 and the seat 116 are preferably constructed of dissimilar materials such as stainless steel and Teflon polytetrafluoroethylene to prevent the catalyzed resin from sealing the stopper 118 against the seat 116 during operation of the gun 10.

In one embodiment shown in FIG. 6, the walls 113 of the bolt 108 extend a predetermined distance past the seat 116. The diameter of the channel created by the extended walls 113 is slightly larger than the diameter of the stopper 118 so that the air/catalyst mixture flows between the stopper 118 and the extended walls 113 when the valve 106 is in the open position. This air flow helps to clean off and prevent the build up of any resin that has made it way to the valve's 106 stopper 118.

The check valve 106 is designed with an approximately five pound per square inch blow-off so that as soon as the pressure within the bolt 108 is five pounds per square inch greater than the pressure against the spring side of the stopper 118, the stopper 118 moves out of the seat 116 to allow air to pass out of the bolt 108. A particular advantage of this configuration is that the spring 112 is always in contact with air and never in contact with catalyzed resin. The closure mechanism 106 thereby protects itself from contamination and malfunction due to contact with catalyzed resin.

In the embodiment shown in FIG. 5, a ninety-degree adapter 120 is used to connect the check valve 106 to an air tube 122. The air tube 122 is secured to a plug quick disconnect 124. The air tube 122 is preferably secured to the manifold 12 by a bracket or similar securement means to place the plug quick disconnect 124 near the catalyst line connector 32 and the fluid hose T-adapter 52, so that all of the hose connections may be made quickly and easily.

Figure 3:
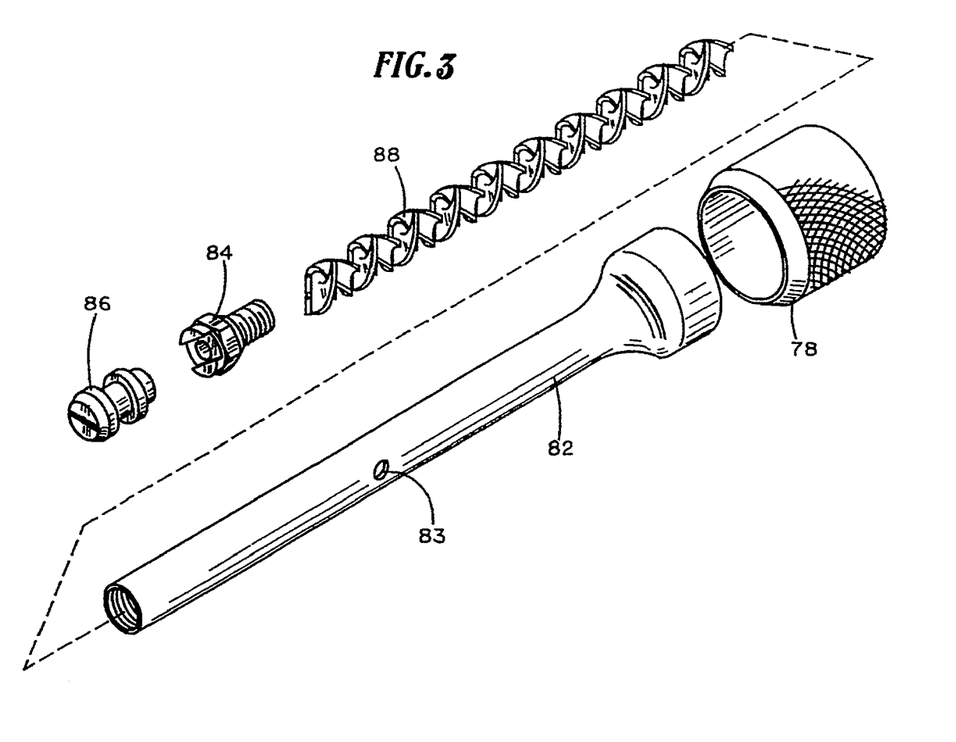
FIG. 3 is an exploded perspective view of the nozzle tip, ferrule and disposable static mixing tube of the present invention.

The static mixing tube 82 is placed over the ferrule mount 74 and the ferrule 78 is placed over the mixing tube 82, slid down the tube 82, and screwed onto the ferrule mount 74 to secure the static mixing tube 82 to the manifold 12 (FIGS. 1 and 5). In the preferred embodiment, the static mixing tube 82 is composed of an inexpensive and lightweight plastic such as polyethylene or polypropylene. These materials insure that the tube 82 does not add extraneous weight to the spray gun 10 and that the tube 82 may be disposed of each time the spray gun 10 ceases spraying resin long enough to allow the catalyzed resin to set up within the tube 82. The rearward end of the tube 82 is flanged to prevent the tube 82 from becoming detached from the manifold 12 after the ferrule 78 has been screwed into place (FIGS. 1 and 3). The forward end of the static mixing tube 82 is provided on its interior circumference with threads so that a spray tip body 84 may be screwed into the tube 82. The spray tip 86 is secured to the spray tip body 84, to controllably disburse the catalyzed resin being expelled from the spray gun 10. The threads on the static mixing tube 82 provide the spray tip 86 with the ability to be quickly disconnected from the static mixing tube 82 by hand to remove plugs during operation of the gun 10.

Placed within the static mixing tube 82 and running the entire length of the tube 82 is a spiral mixer 88 (FIG. 3). The spiral mixer 88 is preferably of a reversely flighted segmented pattern with each segment being reversely flighted from adjacent segments. This pattern is continued along the length of the spiral mixer 88 to allow homogenous mixing of the catalyst and resin as they pass through the static mixing tube 82. The tube 82 and spiral mixer 88 are preferably molded of an inexpensive plastic so that after spraying, catalyzed resin need not be removed from the tube 82. Instead of rinsing the tube 82 with a costly and hazardous solvent such as acetone, the tube is set aside until the resin hardens within the tube 82. After the resin has hardened, the tube 88 poses no more environmental hazard than a plastic stick and is simply thrown away after use. Unnecessary proliferation of toxic solvents into the environment is thereby eliminated.

The side of the static mixing tube 82 is provided with an orifice 83 into which is placed a chamfered air supply tube tip 90 (FIGS. 3 and 5). The air/catalyst mixture enters the mixing tube 82 through tube tip 90 where it mixes with the resin that is already in the mixing tube 82. The atomization of the catalyst in the air supply line prior to its introduction with the resin helps the catalyst mix with the resin in the tube. As discussed above, some prior art devices had inefficient mixing of resin and catalyst because the catalyst and resin would create their own separate paths as they migrated through the mixing tube 82. The air pressure also helps the heavily filled system of resin, filler, and catalyst shear at the spray tip 86. A rubber tip seal 92 is placed between the tube tip 90 and the static mixing tube 82 to prevent air and catalyzed resin from escaping the static mixing tube 82 through the orifice 83 shown in FIGS. 4 and 5.

The air supply tube tip 90 is held in place by a connector assembly 94 (FIG. 5). A tube tip bracket 96 is preferably formed of a thin sheet of metal and is designed to fit around the tube tip 90 and halfway around the circumference of the static mixing tube 82. The ends of the tube tip bracket 96 extend away from the static mixing tube 82 yet parallel with one another. A securement bracket 98 is formed of a thin sheet of metal to fit securely around half of the circumference of the static mixing tube 82. The ends 100a-b of the securement bracket 98 extend outwardly from the static mixing tube 82 yet parallel with the ends 102a-b of the tube tip bracket 96. The ends 102a-b of the tube tip bracket 96 and ends 100a-b of the securement bracket 98 are supplied with holes so that they may be secured together. In the preferred embodiment, one set of ends 100a and 102a is secured with a nut and bolt while the other set of ends 100b and 102b is secured with a much larger nob screw 104. The nob screw 104 is provided so that the connector assembly 94 may be easily manipulated by an operator in the field to release the static mixing tube 82.

To begin application of catalyzed resin, the fluid hose T-adapter 52 is connected to a line supplying a resin, such as polyester, and the catalyst line connector 32 is connected to a line supplying a catalyst such as methyl-ethyl-ketone peroxide (FIG. 5). The plug quick disconnect 124 is connected to an air supply line to begin the flow of air through the air tube 122. The spray tip 86 of the gun 10 is pointed at an article which is to be treated with the spray tip 86 kept at a distance of about twelve inches from the surface of the article. The gun 10 is firmly grasped by the handle 17, while the switch handle shaft 70 is slowly moved forward to open the ball valve assemblies 30 and 44 (FIG. 1). As catalyst and resin begin to flow through the manifold 12, the catalyst gauge 24 is monitored for proper pressure. The resin passes through the manifold 12 and into the static mixing tube 82. The catalyst passes through the manifold 12 and into the air supply line where it is atomized and then introduced into the static mixing tube 82. As the resin combines with the catalyst in the mixing tube 82, air supplied through the mixing tube tip 90 forces the catalyzed resin through the spray tip 86. As the catalyzed resin passes through the spray tip 86, the catalyzed resin is sheared and dispersed.

When a particular spraying application has been completed, the switch handle shaft 70 is moved aft to terminate the flow of catalyst resin, and the air supply is thereafter shut down (FIG. 1). The thumb screw 104 is loosened to allow the air supply tube tip 90 to be pulled out of the orifice 83 in the static mixing tube 82 (FIGS. 3 and 5). The ferrule 78 is unscrewed from the ferrule mount 74, and the static mixing tube 82 is removed from the gun 10. The spray tip body 84 and spray tip 86 are removed from the static mixing tube 82, and the ferrule 78 is slid from the static mixing tube 82. The spray tip body 84, spray tip 86, and ferrule 78 are thoroughly cleaned, while the catalyzed resin remaining within the static mixing tube 82 is allowed to harden therein. Once the catalyzed resin within the static mixing tube 82 has hardened, the tube 82 no longer presents an environmental hazard and may, therefore, be disposed of in a landfill or similar depository.

When it is desired to begin spraying, the ferrule 78 is slid over a new static mixing tube 82, and the spray tip body 84 and spray tip 86 are connected to the new static mixing tube 82 (FIGS. 1 and 3). The tube 82 is then mounted to the manifold 12 by means of the ferrule 78, and the tip seal 92 is connected to the static mixing tube 82 by means of the connector assembly 94.

The unique design of the present invention provides a resin/catalyst mixture that mixes more thoroughly than any prior spray gun of which applicant is aware. The introduction and atomization of the catalyst in the air supply line before its introduction with the resin provides thorough and even mixing in the static mixing tube 82. Further, the catalyst need only be introduced to the system at approximately the same pressure as the air is introduced, which is significantly lower and safer than introducing the catalyst at the same pressure as the resin. The spray gun 10 allows resin in the range of one million centipoises (cps) to be applied to articles, whereas the maximum viscosity capable of being supplied by most prior art guns is only 20,000 cps. The ability to spray resins with an increased viscosity, which may or may not be heavily filled with fillers, allows layers of over one centimeter in thickness to be applied to a surface with each pass. This device also reduces the amount of solvent which must be added to the resin during manufacture. Reducing the amount of solvent added to the resin thereby reduces the amount of solvent which eventually evaporates into the air. The internal mixing nature of the present invention also reduces the amount of catalyst atomized directly into the atmosphere and allows the invention to be used in areas where the use of external mix apparatuses is prohibited or in areas where emissions are restricted by law.

Yet another advantage of the spray gun 10 is the elimination of any O-rings within the manifold 12. Typically spray guns have check valves located within the manifold to prevent catalyst from mixing with resin in places where the solvent flush cannot reach. These check valves generally use o-rings to obtain a tight seal against the manifold. After prolonged contact with catalyst, resin and solvent these O-rings often crack or break thereby allowing catalyzed resin by the O-rings. Once catalyzed resin has hardened around or behind the O-rings, the entire manifold must be stripped down and repaired. Furthermore, the manifold is often damaged during removal of damaged O-rings, thereby requiring replacement of the entire spray gun. As the typical spray gun may cost upwards of two thousand dollars, the elimination easily damaged parts, such as O-rings, as in the present invention is of great value to the industry.

The foregoing description and drawings merely explain and illustrate the invention, and the invention is not limited thereto, except insofar as the claims are so limited, as those skilled in the art who have the disclosure before them will be able to make modifications and variations therein without departing from the scope of the invention.

What is claimed is as follows:

1. A sprayer capable of providing a first liquid in confluence with a second liquid whereby the second liquid is combined with a pressurized air stream before its introduction to the first liquid, said sprayer comprising: a first liquid passageway for carrying the first liquid through the sprayer; a second liquid passageway for carrying the second liquid through the sprayer; a pressurized air passageway for carrying the pressurized air through the sprayer, wherein the second liquid passageway feeds into the air passageway so that the second liquid combines with the pressurized air stream before its introduction to the first liquid; and a first check valve between the second liquid passageway and the air passageway, wherein said first check valve adapted to close and prevent the second liquid from draining out of the second liquid passageway when the second liquid is not being pumped through the second liquid passageway;

wherein the first check valve comprises a bolt frame chamber having walls and a stopper that fits into a seat; and wherein the chamber walls of the frame extend longitudinally outward past the seat so that when the stopper is removed from the seat by pressure thereby allowing the second liquid to pass through the check valve, the stopper remains within the extended chamber walls.

2. The sprayer of claim 1 further comprising a second check valve located downstream from the junction of the second liquid passageway and the air passageway, said second check valve for preventing the backflow of the first liquid into the air passageway.

3. The sprayer of claim 2 wherein the second check valve comprises a bolt frame having walls and a stopper that fits into a seat; and wherein the walls of the frame extend longitudinally outward past the seat so that when the stopper is removed from the seat thereby allowing the second liquid and pressurized air to pass through the second check valve, the stopper remains within the extended walls.

4. The sprayer of claim 1 wherein the chamber walls have a first diameter and the stopper has a second diameter, wherein the first diameter is slightly larger than the second diameter.

* * * * *